E. VAN WAGENEN.
ELECTRICAL SYSTEM OF DISTRIBUTION.
APPLICATION FILED FEB. 15, 1909.
1,145,339.
Patented July 6, 1915.
2 SHEETS—SHEET 1.
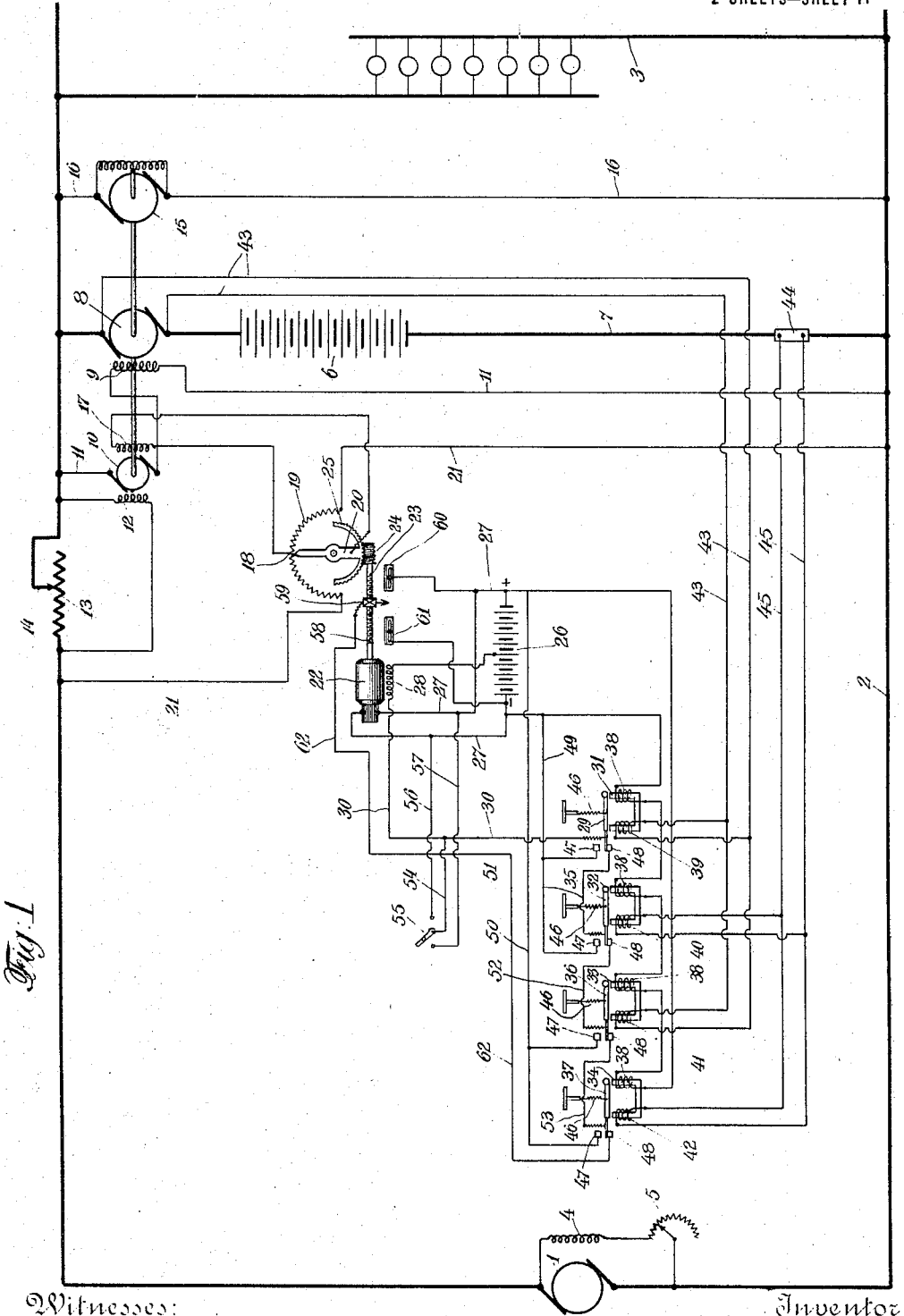
Witnesses:
John O. Gempler
George Harris
Inventor
Edward Van Wagenen
By his Attorneys
Kenyon & Kenyon

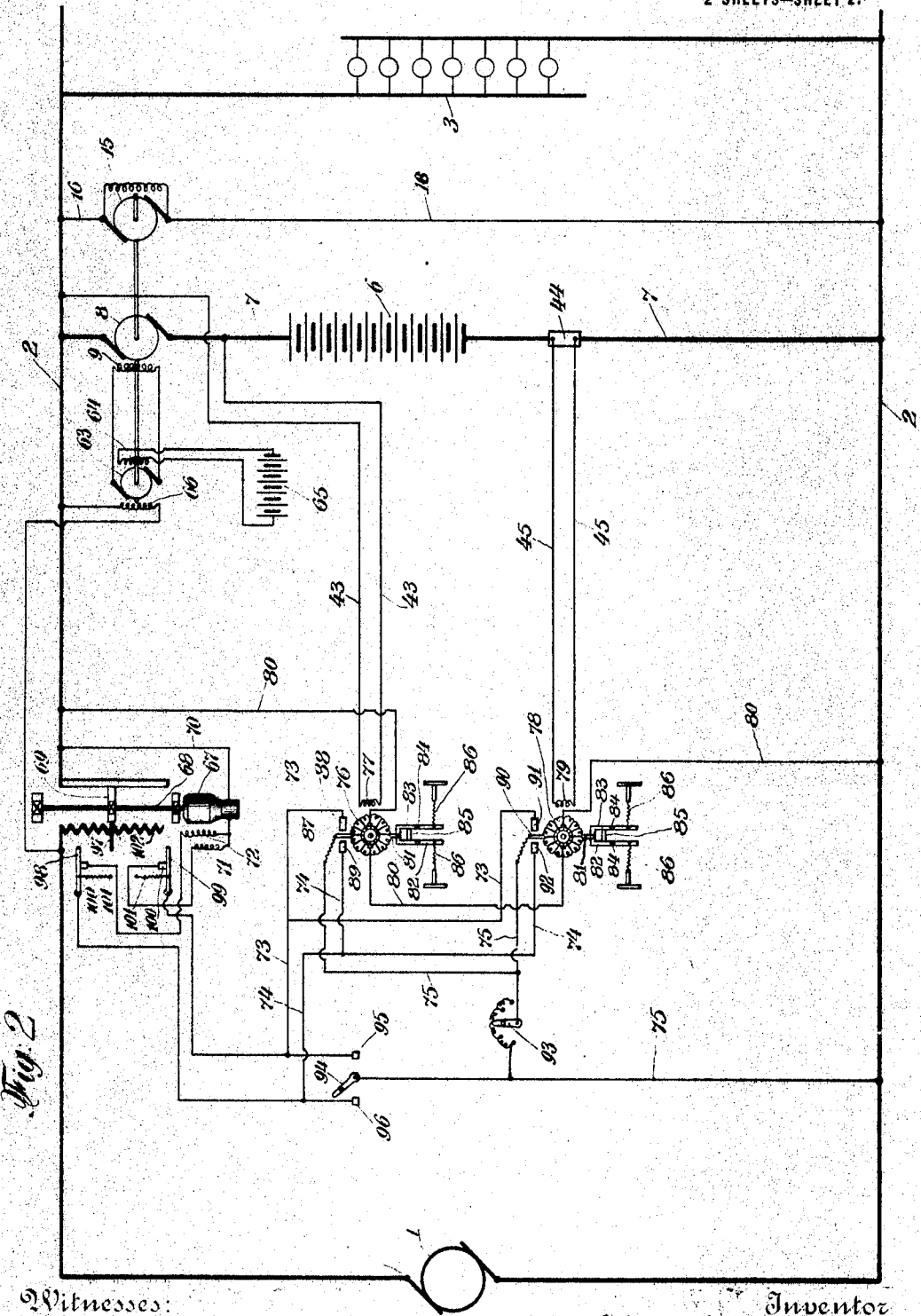

UNITED STATES PATENT OFFICE.

EDWARD VAN WAGENEN, OF NEW YORK, N. Y., ASSIGNOR TO GOULD STORAGE BATTERY COMPANY, A CORPORATION OF NEW YORK.

ELECTRICAL SYSTEM OF DISTRIBUTION.

1,145,339.  Specification of Letters Patent.  Patented July 6, 1915.

Application filed February 15, 1909. Serial No. 477,977.

*To all whom it may concern:*

Be it known that I, EDWARD VAN WAGENEN, a citizen of the United States, and a resident of the city, county, and State of New York, have invented certain new and useful Improvements in Electrical Systems of Distribution, of which the following is a specification.

My invention relates to electrical systems of distribution and is more especially adapted to be used in connection with systems in which a main source of electrical energy and a storage battery coöperate to supply a work circuit and in which automatic means are employed to control the division of load between the battery and the source. In such systems it is common to so arrange the regulating apparatus that when the load on the generator increases above a predetermined average value the increase of load is taken by the battery, and when the load on the system drops below a predetermined average value the regulating apparatus causes the battery to be charged from the source. In such systems it often happens that such an increase of load will fall upon the system and such increase will be maintained for a considerable length of time. In such a case it is often desirable that a material portion of the increase of load be transferred back to the source, that is, that the average load that is taken by the source be increased so that only the small fluctuations of load will fall upon the battery.

One object of my invention is to provide automatic means for thus regulating or adjusting the average load which is taken by the main source or generator. To this end I preferably provide a regulating apparatus which, when the load on the battery circuit has reached a predetermined value, operates to adjust the average load which falls upon the generator until the load on the battery circuit drops below said predetermined value.

Further objects, features and advantages will more clearly appear from the detailed description given below taken in connection with the accompanying drawings which form a part of this specification.

Referring to the drawings, Figure 1 represents diagrammatically a system embodying one form of my invention. Fig. 2 represents a system similar to that shown in Fig. 1, but showing a modified embodiment of my invention.

Referring to Fig. 1, 1 represents a main generator feeding the consumption circuit 2, 2, which is connected to the load 3. The generator 1 is provided with a shunt field coil 4 having an adjustable resistance 5 in series therewith. 6 represents a storage battery connected across the circuit 2, 2, by means of a circuit 7. In series in the circuit 7 with the battery 6 is a booster 8. The booster 8 is provided with a field coil 9 in series with a counter-electromotive force machine 10 connected across the circuit 2, 2, by conductors 11. The counter-electromotive force machine 10 is provided with a field coil 12 in shunt to a resistance 13, which resistance is in series in the consumption circuit 2, 2. The resistance 13 is provided with a movable contact 14 for the purpose of adjusting the value of the same. The counter-electromotive force machine 10 and the booster 8 are driven by a shunt motor 15 connected across the circuit 2, 2, by conductors 16. Under normal conditions, when there is a normal average load upon the circuit 2, 2, the field strength of coil 12 is just sufficient to cause the counter-electromotive force machine 10 to produce an electromotive force in the circuit 11 equal to but opposite in direction to the electromotive force applied to said circuit by the generator 1. No current will, therefore, flow in the field coil 9 of the booster 8 and the battery 6 will float across the line. Upon an increase in load on the consumption circuit the field coil 12 is responsive thereto and increases the excitation of the counter-electromotive force machine 10 to cause a current to flow through the field windings 9 of the booster in a direction to cause the booster to produce an electromotive force to cause the battery to discharge and take substantially the increase in load. When the load on the system drops below said average value the current in field coil 12 is decreased, thereby allowing the current to flow in the field windings 9 of the booster 8 in the opposite direction, so that the booster produces an electromotive force to cause the battery to receive current from the consumption circuit and be charged thereby. In order that the average load, to departures from which the exciter 10 is responsive, may be varied and adjusted I provide the exciter with additional field windings 17, one end of which is connected to the middle point 18 of a rheostatic resistance 19, and the other end of which is connected to a movable arm 20 of said resistance. The rheostatic resistance 19 is connected across the circuit 2, 2, by conductors 21. The movable arm 20 of said resistance is adapted to contact with various points of the resistance 19, thereby connecting the field windings 17 to points having various different potentials. The movable arm 20 is operated by a motor 22 driving a shaft 23 having a worm 24 which engages and drives a segment 25 fixedly secured to the arm 20. 26 represents an auxiliary storage battery which furnishes current to the armature of the motor 22 by means of conductors 27. The motor 22 is provided with a field winding 28, one end of which is connected to the middle point of battery 26 and the other end of which is connected by conductor 30 to the movable arm 29 of a dynamometer arrangement 31. 32, 33 and 34 represent dynamometers similar to the dynamometer 31. These dynamometers are arranged to operate movable arms 35, 36 and 37 respectively. Each dynamometer is provided with an electromagnet coil 38, which coils 38 are connected in series across the auxiliary battery 26 so that they receive a substantially constant excitation. Wound upon the same core structure and opposing the various coils 38 are coils 39, 40, 41 and 42 for the various dynamometers 31, 32, 33 and 34 respectively. The coils 39 and 41 are connected in parallel across the booster 8 by means of conductors 43. By means of conductors 45 the coils 40 and 42 are connected in parallel with each other and with a small resistance 44, which resistance is in series in the battery circuit 7. Each of the movable arms 29, 35, 36 and 37 of the various dynamometers are acted upon by springs 46, which tend to retract said arms away from the electromagnet coils of the various dynamometers. Each dynamometer is provided with two contacts, an upper contact 47 and a lower contact 48. When the arms or armatures of the various dynamometers are pulled downward by the electromagnet they contact electrically with the lower contacts 48 and when said armatures are pulled upward by the springs 46 they contact with the upper contacts 47. The upper contacts 47 of dynamometers 31 and 32 are connected to the negative side of the auxiliary battery 26 by means of a conductor 49. The upper contacts 47 of dynamometers 33 and 34 are connected to the opposite side of the auxiliary battery 26 by means of a conductor 50. The lower contact 48 of dynamometer 31 is connected to the arm or armature 35 of dynamometer 32 by means of a conductor 51; the lower contact 48 of dynamometer 32 is connected to the arm or armature 36 of dynamometer 33 by means of conductor 52, and the lower contact 48 of dynamometer 33 is connected to the arm or armature 37 of dynamometer 34 by means of a conductor 53. In this figure the various armatures 29, 35, 36 and 37 are shown in their lower or inoperative positions, held thus by the electromagnetic action of the various coils 38. When the current in any one of the coils 39, 40, 41 or 42 increases to a sufficient value the electromagnetic action of the dynamometer on which said coil is located becomes sufficiently decreased so that its armature is pulled upward by the action of the spring 46. In so doing contact is made through contact point 47, either with the conductor 49 or with the conductor 50, so that contact is made with either one side or the other of auxiliary battery 26, thus connecting the field coil 28 of the motor 22 either with the positive or negative side of the auxiliary battery 26. If connected to the positive side of the battery 26 the motor will, of course, operate in one direction and if connected to the negative side of the battery the motor will operate in the opposite direction. The dynamometer 31 is arranged to operate only when the voltage across the booster is in a certain direction and the dynamometer 33 is so wound that it operates only when the voltage across the booster is in the opposite direction. Likewise the dynamometer 32 is wound to operate only when the battery current is in a certain direction and the dynamometer 34 is wound to operate only when the battery current is in the opposite direction. The operation of the system thus far described is as follows. When the load on the system becomes excessive and is greater than some predetermined value, which value is greater than the average load at departures from which the booster is responsive, this excess load being due either to an excessive load upon the work circuit or an excessive battery charging current, one or more of the dynamometers will operate to cause the motor 22 to be energized thereby varying the excitation of the exciter 10 and readjusting the average load. Thus one of the dynamometers is responsive to variations from a predetermined value of battery charging current; another is responsive only to variations from an independent predetermined value of battery discharging current; another is responsive only to variations from a predetermined value of booster voltage when the voltage is in one direction, and the fourth dynamometer is responsive only to variations from an independent predetermined value of booster voltage when the booster voltage is in the opposite direction. When any one of these predetermined values has been reached the field coil 28 of motor 22 is energized in the proper direction to cause the arm 20 of rheostat 19 to move in the proper direction to cause the field windings 17 to be excited to vary the excitation of the exciter 10. If this action is due to an increase in load on the system the coil 17 opposes the coil 12, thereby allowing the generator to take a much greater load or increase the average load which will fall upon the generator. If the action is due to a decrease of load on the system and an increase of battery charging current the winding 17 aids the windings 12, thereby allowing the load on the generator to fall so that its average load is decreased. In case it is desired to change the average load in this manner without the operation of the various dynamometers I have provided a conductor 54 connected with one end of the field 28 of motor 22 by means of a conductor 30. The conductor 24 can be connected to either the positive or negative side of the battery 26 by means of a switch 55 and conductors 56 or 57, so that the field coal 28 may be energized either in one direction or the other, by hand, as desired. In some cases it may be preferable that when the motor has ceased operating, due to the deënergization of electromagnet coils 39, 40, 41 or 42, that the average load be returned to within certain predetermined limits. In order to effect this I provide means for returning the arm 20 to within such predetermined limits. The shaft 23 of motor 22 is provided with threads 58, which threads carry and move a movable member 59 thereon. The member 59 carries a contact adapted to engage with either one or the other of the elongated contacts 60 or 61. The contact 60 is connected to the positive side of the battery 26 and the contact 61 is connected to the negative side thereon. The movable member 59 is connected to the lower contact 48 of dynamometer 34 by means of a conductor 62. Thus when the operating dynamometer returns to its initial position the field coil 28 of the motor is connected to the opposite terminal of the auxiliary battery 26, so that it is caused to rotate in the opposite direction until the arm 20 has reached a predetermined position, which position will be determined by the point at which the movable contact member 59 leaves either the elongated contact member 60 or 61. Thus if one of the dynamometers is operated so that the field coil 28 is connected to the positive side of the battery the contact 59 will be moved toward or over the contact 61. When said dynamometer returns to its initial position the field coil 28 is connected across the negative side of the battery 26 so that the motor 22 is caused to rotate in the opposite direction until the contact member 59 leaves the contact 61. The function of this operation is to return the arm 20 to within a predetermined range or bring the average load back to within a predetermined value, just as soon as the excess load begins to fall off and without waiting for an excess variation in load to take place in the opposite direction to readjust the average load.

Referring to Fig. 2, parts there shown with the same reference characters are similar and operate similarly to the parts so indicated in Fig. 1. The field coil 9 of the booster 8 is energized by an exciter 63 which is provided with a field coil 64 having a constant excitation derived from an auxiliary battery 65. The regulating excitation of the machine 63 is provided by a field coil 66 connected in shunt to a variable resistance 102 in series in the consumption circuit 2, 2. Under normal conditions the magneto-motive force produced by the coils are equal but opposite in direction, so that no excitation is produced by the booster 8 and the battery will float across the line. Upon an increase or decrease of load upon the system the apparatus operates substantially as described with respect to the system as shown in Fig. 1. In order to change the effect of the field coil 66 and thereby vary the average load upon the main generator 1, I provide a motor 67 operating a threaded shaft 68 carrying a movable contact 69 which is arranged to cut various parts of the resistance 102 in and out of the consumption circuit 2, 2. One terminal of the motor 67 is connected to one side of the circuit 2, 2, by conductor 70 and the other terminal is connected to two field coils 71 and 72 which are parallel with each other but which are connected in series with conductors 73 and 74 respectively and which are arranged to be connected to the positive side of the circuit 2, 2, by means of appropriate switching mechanism and conductors 75. 76 represents the armature of a motor or dynamometer arrangement having a field coil 77 connected in series with the circuit 43, 43. 78 represents the armature of a motor or dynamometer arrangement having a field coil 79 connected in series with the circuit 45, 45, across the shunt 44. The armatures 76 and 78 are connected in series in a circuit 80 connected across the consumption circuit 2, 2. Each of the dynamometers is provided with an arm 81. 82 and 83 represent two pivoted members pivoted at 84, all of which are normally held against stops 85 by means of springs 86. Under normal conditions the arm 81 engages both of the members 82 and 83 but these members 82 and 83 exert no torque thereupon on account of stops 85. When either of the dynamometers exert a torque sufficient to overcome the opposing action of one of the springs 86 the armature is moved in a direction in accordance with the direction of its field current. The dynamometer armature 76 carries a contact arm 87 adapted to contact with either of the contacts 88 or 89 in accordance with the direction of movement of that dynamometer armature. The dynamometer armature 78 carries a contact arm 90 adapted to contact with either of the contacts 91 or 92 in accordance with the direction of movement of that armature. Contacts 89 and 92 are connected to conductor 74 and contacts 88 and 91 are connected to conductor 73 while contact arms 87 and 90 are connected to conductor 75, the conductor 75 having an adjusting resistance 93 in series therewith. When the current in the battery circuit reaches a predetermined value in one direction a torque is produced in dynamometer 78 in a direction to connect contacts 90 and 91, thereby throwing the field coil 71 and motor 67 in circuit, so that the resistance 67 is varied in order to adjust the average load which will fall upon the generator 1 in a manner similar to that described in connection with Fig. 1. If the battery current reaches a predetermined value in the opposite direction contacts 90 and 92 are brought together, so that field coil 72 and motor 67 are thrown into operation in the opposite direction to readjust the average load on the generator 1 in the opposite direction. In a like manner the field coil 77 coacts with the armature 67 responsive to variations from a predetermined value of booster voltage to adjust or readjust the average load which will fall upon the main generator 1. In case it is desired to cause such adjustment or readjustment manually I provide a hand switch 94 arranged to connect the conductor 75 with either of the field coils 71 or 72 by throwing it into connection with the contacts 95 or 96 respectively. If the load regulating apparatus were so arranged that it tended to return to its normal position as soon as the peak had passed, it would mean that the generating equipment would tend to take all the fluctuations above a certain predetermined value. With the arrangement as drawn however, requiring that a considerable reduction or possibly actual reversal of the peak occur before the load adjusting apparatus tends to return to normal position, the system will operate with battery equipment still taking the fluctuations but on a higher average setting of the generators—the generators however operating at a steady load. Further, when excessive peaks occur either in battery or booster voltage, it will usually be found that the average load on the system is either increased or decreased so as to tend to give the battery either a net charge or discharge. My arrangement tends to counteract this condition and bring the battery to normal. In order to keep the described regulation within certain limits I provide the movable member 69 with an extension 97, which when the contact member 69 has reached a predetermined point contacts with either the switch member 98 or the switch member 99 to open the circuits through the field coils 72 or 71 respectively. Under normal conditions the circuits through the switch members 98 and 99 and contacts 100 are maintained closed by springs 101.

In both of the systems shown in Figs. 1 and 2 it will be apparent that the average generator load adjusting devices do not begin to operate immediately upon any current flowing in the battery circuit or immediately there is a difference of potential across the booster, but only when the current in the battery circuit or the potential across the booster has increased to predetermined value sufficient to cause the dynamometers to operate.

From the above it will be apparent that I provide an exceptionally economical and efficient means for automatically adjusting the average load upon an electrical system of distribution and in such a manner that the battery is not unduly overworked and the generator may be allowed to supply the greater part of the load without receiving the small fluctuations thereof.

Although I have described my improvements with respect to particular systems of distribution I do not desire to be limited thereto or to the various details shown and described, but Having fully and clearly described my improvements what I claim as new and desire to secure by Letters Patent, is:

1. In an electrical system of distribution, a source of electromotive force, a storage battery and work circuit in operative relation thereto, means for causing the battery to charge from the source and discharge to the work circuit responsive to departures from a certain average load, and means for varying said average load, said last mentioned means operating responsive to a certain increase in load in the battery circuit and acting to vary the average load only when the load in the battery circuit has reached a predetermined value.

2. In an electrical system of distribution a generator, a supply circuit and its load fed thereby, a storage battery and its circuit in operative relation therewith, means for causing the battery to charge and discharge from and to the supply circuit when the load on the system varies from a predetermined value, and means for changing said predetermined value when the current in the battery circuit has reached a predetermined value.

3. In an electrical system of distribution, a source of electromotive force, a supply circuit and its load fed thereby, a storage battery and its circuit in operative relation therewith, a booster in series with the battery, means for controlling the booster to cause it to cause the battery to charge and discharge responsive to departures from a predetermined average load on the supply circuit, and means for varying said average load, said last mentioned means operating responsive either to a certain increase in load in the battery circuit or to a certain increase in booster voltage and acting to vary the average load only when said increase has reached a predetermined value.

4. In an electrical system of distribution, a source of electromotive force, a supply circuit and its load fed thereby, a storage battery and its circuit in operative relation therewith, a booster in series with the battery, means for controlling the booster to cause it to cause the battery to charge and discharge responsive to departures from a predetermined average load on the supply circuit, and means for varying said average load, said last mentioned means operating responsive to a certain increase in booster voltage and acting to vary the average load only when the booster voltage has reached a predetermined value.

5. In an electrical system of distribution a generator, a supply circuit and its load fed thereby, a storage battery and its circuit in operative relation therewith, means, including a booster, for causing the battery to charge and discharge from and to the supply circuit when the load on the system varies from a predetermined value, and means for changing said predetermined value when the voltage across the booster has increased to a predetermined value.

6. In an electrical system of distribution, a source of electrical energy, a work circuit arranged to be supplied thereby, a storage battery in operative relation thereto, a variable resistance for determining the average load which shall fall upon the source, means for causing the battery to take part of the load upon the system when the load thereupon increases above said average, and means for varying said resistance in one direction when the battery charging current has reached a predetermined value and for varying said resistance in the opposite direction when the battery discharging current has reached an independent predetermined value.

7. In an electrical system of distribution, a source of electrical energy, a work circuit arranged to be supplied thereby, a storage battery in operative relation thereto, means for controlling the division of load between the source and battery whereby a predetermined average load is caused to fall upon the source, means for increasing said average load which falls upon the source when the load falling on the battery has increased to a certain value and for decreasing said average load when the load taken by the battery in the charging thereof has increased to a certain value.

8. In an electrical system of distribution, a source of electrical energy, a work circuit arranged to be supplied thereby, a storage battery in operative relation thereto, a variable resistance for determining the average load which shall fall upon the source, means for causing the battery to take part of the load upon the system when the load thereupon increases above said average, an electroresponsive device for varying said resistance, a plurality of coils for independently controlling said device and hand operated means for controlling said device.

9. In an electrical system of distribution, a generator, a supply circuit and its load fed thereby, a storage battery and its circuit in operative relation therewith, a booster for controlling the battery action, a variable resistance for determining the predetermined value of load upon the system at which the booster is brought into operation, means independent of said resistance for regulating the booster action, coils for controlling said resistance responsive to variations in the battery current and windings for controlling said resistance responsive to variations in the booster voltage.

10. In an electrical system of distribution, a source of electromotive force, a storage battery and work circuit in operative relation thereto, means for causing the battery to charge from the source and discharge to the work circuit responsive to departures from a certain average load, and means for varying said average load, said last mentioned means operating responsive to variations in voltage in the battery circuit and acting to vary the average load only when the change in battery voltage has reached a predetermined value due to charging or discharge of the battery.

11. In an electrical system of distribution, a generator, a supply circuit and its load fed thereby, a storage battery and its circuit in operative relation therewith, a booster for controlling the battery action, a variable resistance for determining the predetermined value of load upon the system at which the booster is brought into operation, means independent of said resistance for regulating the booster action, means for varying said resistance to vary the average load upon the generator responsive to variations from a predetermined load on the battery, and means for returning said resistance to within predetermined limits upon the non-actuation of said first mentioned resistance varying means.

12. In an electrical system of distribution, a source of electromotive force, a storage battery and work circuit in operative relation thereto, means for causing the battery to charge from the source and discharge to the work circuit responsive to departures from a certain average load, means for varying said average load, said last mentioned means operating responsive to a certain increase in load in the battery circuit and acting to vary the average load only when the load in the battery circuit has reached a predetermined value, and means for automatically limiting the value to which said average load may be varied.

13. In an electrical system of distribution, a generator, a supply circuit and its load fed thereby, a storage battery and its circuit in operative relation therewith, a booster for controlling the battery action, a variable resistance for determining the predetermined value of load upon the system at which the booster is brought into operation, means independent of said resistance for regulating the booster action, a motor arrangement for varying said resistance, electromagnetic switches for controlling the fields of the motor responsive to variations in the battery current and electromagnetic switches for controlling the fields of the motor responsive to variations in the booster voltage.

14. In an electrical system of distribution, a generator, a supply circuit and its load fed thereby, a storage battery and its circuit in operative relation therewith, a booster for controlling the battery action, a variable resistance for determining the predetermined value of load upon the system at which the booster is brought into operation, means independent of said resistance for regulating the booster action, an electroresponsive device for controlling said variable resistance, a dynamometer for controlling the energization of said device and means for preventing the actuation of said dynamometer until the load on the battery circuit has reached a predetermined value.

15. In an electrical system of distribution, a generator, a supply circuit and its load fed thereby, a storage battery and its circuit in operative relation therewith, a booster for controlling the battery action, a variable resistance for determining the predetermined load upon the system at which the booster is brought into operation, means independent of said resistance for regulating the booster action, a motor arrangement for varying said resistance, a coil for controlling the field of the motor responsive to variations in battery current and a coil for controlling the field of the motor responsive to variations in the booster voltage.

16. In an electrical system of distribution, a source of electrical energy, a consumption circuit fed thereby, a storage battery in operative relation thereto, a booster for controlling the action of the battery, a coil responsive to current fluctuations in the consumption circuit, said coil being arranged to cause the booster to operate when the current in the coil varies from a predetermined value, means for varying said predetermined value when the potential across the booster has increased to a certain amount and independent means whereby said predetermined value is varied when the current in the battery has increased to a certain amount.

17. In an electrical system of distribution, a source of electromotive force, a supply circuit and its load fed thereby, a storage battery and its circuit in operative relation therewith, a booster in series with the battery, means for controlling the booster to cause it to cause the battery to charge and discharge responsive to departures from a predetermined average load on the supply circuit, means for varying said average load, said last mentioned means operating responsive to a certain increase in booster voltage and acting to vary the average load only when the booster voltage has reached a predetermined value and means for automatically limiting the value to which said average load may be varied.

18. In an electrical system of distribution, a source of electrical energy, a consumption circuit fed thereby, a storage battery in operative relation thereto, a booster for controlling the action of the battery, a resistance in series in the consumption circuit, a coil responsive to current fluctuations in said resistance, said coil being arranged to cause the booster to operate when the current in the coil varies from a predetermined value, an apparatus for adjusting said predetermined value of current in said coil, means responsive to variations from a predetermined load on the battery when the battery is discharging for causing the apparatus to operate in one direction to decrease the current in said coil, and means responsive to variations from a predetermined load on the battery circuit when the battery is charging, for causing the apparatus to operate in the opposite direction to increase the current in said coil.

19. In an electrical system of distribution, a source of electrical energy, a work circuit arranged to be supplied thereby, a storage battery in operative relation thereto, means for controlling the division of load between said source and battery, means for determining the average load which falls upon said source and means for adjusting said last mentioned means to vary the average load which falls upon the source responsive to certain load changes on the battery, and means for rearranging said adjusting means so that the average load is returned to within predetermined limits responsive to the deënergization of said adjusting means.

20. In an electrical system of distribution, a source of electrical energy, a work circuit arranged to be supplied thereby, a storage battery and its circuit in operative relation thereto, means for controlling the division of load between said source and battery, means for determining the average load which falls upon said source, means for adjusting said last mentioned means, means for actuating said adjusting means responsive to certain variations in the electrical condition of the system and means for causing a readjustment of said adjusting means when said actuating means become deënergized.

21. In an electrical system of distribution, a source of electrical energy, a work circuit arranged to be supplied thereby, a storage battery and its circuit in operative relation thereto, means for controlling the division of load between the source and battery whereby a predetermined average load is caused to fall upon the source, and means for varying said average load responsive to variations in the battery current and for varying said average load responsive to variations of voltage in the battery circuit.

22. In an electrical system of distribution, a generator, a supply circuit and its load fed thereby, a storage battery and its circuit in operative relation therewith, a booster for controlling the battery action, a variable resistance for determining the predetermined value of load upon the system at which the booster is brought into operation and means for varying said average load, said last mentioned means embracing an electroresponsive device for controlling said variable resistance, a dynamometer for controlling the energization of said device, and means for preventing the actuation of said dynamometer until its energization has reached a predetermined value.

23. In an electrical system of distribution, a source of electrical energy, a storage battery and work circuit in operative relation thereto, means for controlling the division of load responsive to departures from a predetermined average load on the service, means for automatically increasing or decreasing said average load upon the occurrence of variations in said average load, and means whereby said average load is changed in the opposite direction upon its ceasing to increase or decrease.

In testimony whereof, I have signed my name to this specification, in the presence of two subscribing witnesses.

EDWARD VAN WAGENEN.

Witnesses:
EDWIN SEGER,
RICHARD EYRE.

Copies of this patent may be obtained for five cents each, by addressing the "Commissioner of Patents, Washington, D. C."

---

It is hereby certified that in Letters Patent No. 1,145,339, granted July 6, 1915, upon the application of Edward Van Wagenen, of New York, N. Y., for an improvement in "Electrical Systems of Distribution," an error appears in the printed specification requiring correction as follows: Page 3, line 25, for the word "coal" read *coil;* and that the said Letters Patent should be read with this correction therein that the same may conform to the record of the case in the Patent Office.

Signed and sealed this 10th day of August, A. D., 1915.

[SEAL.]

R. F. WHITEHEAD,

*Acting Commissioner of Patents.*